T. S. REEVE.
Measuring Faucet.
No. 80,307. Patented July 28, 1868.
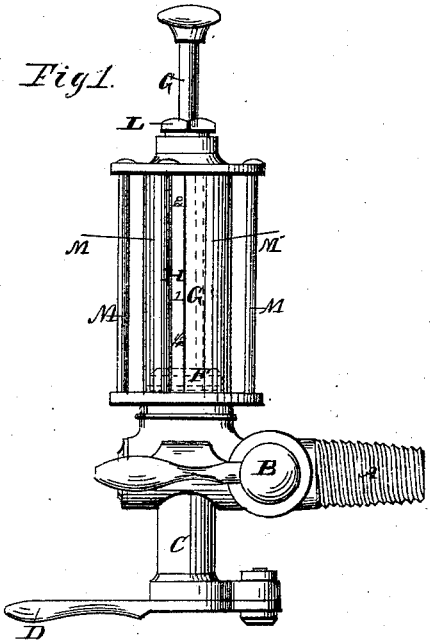
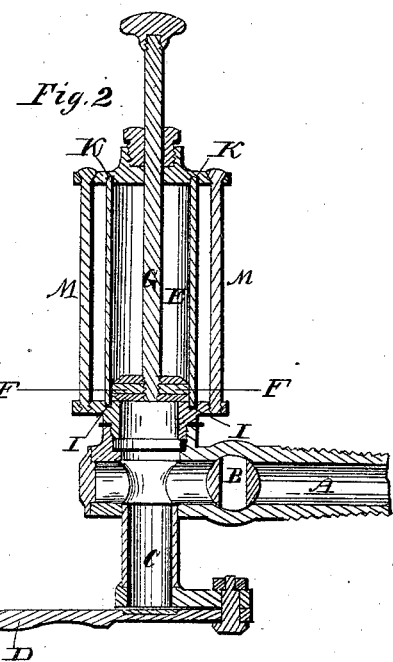
Witnesses:
Francis Beninghausen
Percy B. Smith
Inventor:
T. S. Reeve
By his Attorney
P. B. Smith

United States Patent Office.

THADDEUS S. REEVE, OF CHICAGO, ILLINOIS.

Letters Patent No. 80,307, dated July 28, 1868.

IMPROVEMENT IN MEASURING-FAUCETS.

*The Schedule referred to in these Letters Patent and making part of the same.*

TO ALL WHOM IT MAY CONCERN:

Be it known that I, THADDEUS S. REEVE, of the city of Chicago, county of Cook, and State of Illinois, have invented a new and useful Improvement in Measuring-Faucets; and I do hereby declare that the following is a full, clear, and exact description thereof, which will enable those skilled in the art to make and use the same, reference being had to the accompanying drawing, forming part of this specification, in which—

Figure 1 is a perspective view.

Figure 2, a sectional view.

Similar letters of reference in each of the figures indicate corresponding parts.

The object of my invention is to enable one to draw liquids from casks and measure them accurately.

A is the screw of the faucet, which enters the cask; B, a stop, by which is opened and closed the passage to the cask; C, outlet of the faucet; D, outlet-gate; E, glass cylinder; F, piston inside cylinder E; G, piston-rod; H, gauge on the outside of cylinder E, with figures on it, showing the various measures or quantities the cylinder holds up to the marks; I, recess, turned in the lower cylinder-head, into which is fitted rubber or other packing, and into which fits the lower end of cylinder E; K, a similar recess and packing in the upper cylinder-head, into which fits the upper end of the glass cylinder E; L, stuffing-box; M, rods, which have heads on their upper ends and screws on the lower end, screwing into the lower cylinder-head, holding the cylinder and heads together.

Operation: The faucet being screwed into a cask the same as any other faucet, to facilitate which the cylinder may be unscrewed from the main faucet, there being a screw-joint below the lower cylinder-head, and when the faucet is firmly screwed into the cask, screw on the cylinder, close the gate D, having first pressed the piston F to the bottom of the cylinder; then open stop B, and, by means of rod G, raise piston F, and the liquids from the cask will follow, and when the piston is raised high enough to have the liquid follow up to the mark on the gauge indicating the quantity desired; then close stop B, and, having a vessel under outlet C, open gate D and press down piston F, and the liquid will be discharged. This faucet will not only be found useful in warm or mild weather, but in cold weather will be found particularly advantageous in drawing molasses, oils, and other liquids, which are hardened by cold weather, and besides, it will be found of advantage, insomuch that the cask may be placed in a cellar, and the necessary apparatus may be on an upper floor, where the liquids may be drawn with facility.

What I claim as my invention, and desire to secure by Letters Patent, is—

A measuring-faucet, consisting of screw A, stop B, gate D, cylinder E, piston F, and gauge H, arranged substantially as described.

THADDEUS S. REEVE.

Witnesses:
JOEL LULL,
C. J. CORSE.